(12) United States Patent
Danielson et al.

(10) Patent No.: US 10,814,593 B2
(45) Date of Patent: Oct. 27, 2020

(54) SUPER-VIBRATION DAMPING THERMOPLASTIC ELASTOMER BLENDS AND ARTICLES MADE THEREWITH

(71) Applicant: PolyOne Corporation, Avon Lake, OH (US)

(72) Inventors: Russell Danielson, Crystal Lake, IL (US); Jason D. Piunti, Cedarburg, WI (US); Zachary Muscato, Deforest, WI (US); Malar Shetty, Old Saybrook, CT (US); Jiren Gu, Crystal Lake, IL (US); Krishna Venkataswamy, Crystal Lake, IL (US)

(73) Assignee: Avient Corporation, Avon Lake, OH (US)

( * ) Notice: Subject to any disclaimer, the term of this patent is extended or adjusted under 35 U.S.C. 154(b) by 0 days.

(21) Appl. No.: 16/318,576

(22) PCT Filed: Jul. 24, 2017

(86) PCT No.: PCT/US2017/043447
§ 371 (c)(1),
(2) Date: Jan. 17, 2019

(87) PCT Pub. No.: WO2018/022478
PCT Pub. Date: Feb. 1, 2018

(65) Prior Publication Data
US 2019/0283368 A1 Sep. 19, 2019

Related U.S. Application Data

(60) Provisional application No. 62/366,561, filed on Jul. 25, 2016.

(51) Int. Cl.
*B32B 7/02* (2019.01)
*B32B 25/04* (2006.01)
(Continued)

(52) U.S. Cl.
CPC ............. *B32B 25/045* (2013.01); *B32B 5/18* (2013.01); *B32B 7/12* (2013.01); *B32B 25/14* (2013.01); *B32B 27/065* (2013.01); *B32B 27/08* (2013.01); *B32B 27/20* (2013.01); *B32B 27/22* (2013.01); *B32B 27/32* (2013.01); *B32B 27/34* (2013.01); *B32B 27/36* (2013.01); *B32B 27/365* (2013.01); *B32B 27/40* (2013.01); *C08J 9/0004* (2013.01); *C08J 9/0061* (2013.01); *C08J 9/32* (2013.01); *C08L 53/025* (2013.01); *B32B 2250/24* (2013.01); *B32B 2260/021* (2013.01); *B32B 2262/0269* (2013.01); *B32B 2262/101* (2013.01); *B32B 2262/106* (2013.01); *B32B 2264/0264* (2013.01); *B32B 2264/0278* (2013.01); *B32B 2264/0292* (2013.01); *B32B 2266/0207* (2013.01); *B32B 2266/0228* (2013.01); *B32B 2270/00* (2013.01); *B32B 2307/51* (2013.01); *B32B 2307/56* (2013.01); *B32B 2307/734* (2013.01);
(Continued)

(58) Field of Classification Search
CPC ............ B32B 2270/00; B32B 2307/51; B32B 2307/56; B32B 2319/00; B32B 25/045; B32B 25/14; B32B 2605/00; B32B 27/20; B32B 27/22; B32B 27/40; C08J 2201/03; C08J 2203/22; C08J 2205/052; C08J 2205/06; C08J 2353/02; C08J 2400/22; C08J 9/0061; C08L 53/025
See application file for complete search history.

(56) References Cited

U.S. PATENT DOCUMENTS 4,411,954 A 10/1983 Butch, III
4,886,696 A 12/1989 Bainbridge
(Continued)

FOREIGN PATENT DOCUMENTS

CN 1648161 A 8/2005
EP 2403748 B1 10/2013
(Continued)

OTHER PUBLICATIONS

Kilian et al.: "Two new HSBCs for potential medical use," TPE Magazine, Apr. 2010, pp. 220-225.
(Continued)

*Primary Examiner* — Lawrence D Ferguson
(74) *Attorney, Agent, or Firm* — Michael J. Sambrook; Emily E. Vlasek (57) ABSTRACT

A thermoplastic elastomer compound includes hydrogenated styrenic block copolymer having a polyisoprene soft block, styrene-isobutylene-styrene block copolymer, tackifier having a softening point of at least about 80° C. according to ASTM 6493, and, optionally, one or more additional thermoplastic elastomers. The compound has a Compound Tan Delta Peak Temperature (at 10 Hz) of at least 10° C. and a Compound Tan Delta Peak Height (at 10 Hz) of at least 0.85 if no thermoplastic polyurethane is present and at least 0.60 if additional thermoplastic elastomer is present and includes thermoplastic polyurethane. The thermoplastic elastomer compound exhibits superior damping properties across a broad range of temperatures, including at or above room temperature, and across a broad range of vibrational frequencies. The compound in sheet form can be used as a layer in an article of a structure susceptible to forceful impact of any item.

20 Claims, 1 Drawing Sheet

(51) Int. Cl.
| | |
|---|---|
| B32B 25/14 | (2006.01) |
| B32B 27/20 | (2006.01) |
| B32B 27/22 | (2006.01) |
| B32B 27/40 | (2006.01) |
| C08J 9/00 | (2006.01) |
| C08L 53/02 | (2006.01) |
| B32B 27/08 | (2006.01) |
| B32B 27/32 | (2006.01) |
| B32B 5/18 | (2006.01) |
| B32B 27/36 | (2006.01) |
| B32B 27/34 | (2006.01) |
| B32B 27/06 | (2006.01) |
| C08J 9/32 | (2006.01) |
| B32B 7/12 | (2006.01) |

(52) U.S. Cl.
CPC ....... B32B 2319/00 (2013.01); B32B 2419/00 (2013.01); B32B 2509/00 (2013.01); B32B 2571/00 (2013.01); B32B 2605/00 (2013.01); C08J 2201/03 (2013.01); C08J 2203/22 (2013.01); C08J 2205/052 (2013.01); C08J 2205/06 (2013.01); C08J 2207/02 (2013.01); C08J 2353/02 (2013.01); C08J 2400/22 (2013.01); C08J 2453/02 (2013.01)

(56) References Cited

U.S. PATENT DOCUMENTS

| | | |
|---|---|---|
| 4,987,194 A | 1/1991 | Maeda et al. |
| 5,358,783 A | 10/1994 | Diehl |
| 5,399,626 A | 3/1995 | Erickson et al. |
| 5,436,295 A | 7/1995 | Nishikawa et al. |
| 5,612,422 A | 3/1997 | Hucul et al. |
| 5,777,031 A | 7/1998 | Djiauw et al. |
| 5,869,562 A | 2/1999 | Lindquist |
| 5,910,540 A | 6/1999 | Takahashi |
| 5,973,049 A | 10/1999 | Bieser et al. |
| 6,054,532 A | 4/2000 | Wang et al. |
| 6,103,803 A | 8/2000 | Cheung et al. |
| 6,156,842 A | 12/2000 | Hoenig et al. |
| 6,262,161 B1 | 7/2001 | Betso et al. |
| 6,319,969 B1 | 11/2001 | Walther et al. |
| 6,384,138 B1 | 5/2002 | Jacob |
| 6,476,117 B1 | 11/2002 | Wang et al. |
| 6,824,730 B2 | 11/2004 | Mashita et al. |
| 6,984,688 B2 | 1/2006 | Gu |
| 7,015,155 B2 | 3/2006 | Zhou et al. |
| 7,241,837 B2 | 7/2007 | Yaguchi et al. |
| 7,267,855 B2 | 9/2007 | Handlin, Jr. et al. |
| 7,364,221 B2 | 4/2008 | Tahri et al. |
| 7,842,747 B2 | 11/2010 | Gu et al. |
| 7,923,505 B2 | 4/2011 | Zhou et al. |
| 8,299,177 B2 | 10/2012 | Wright et al. |
| 8,378,015 B2 | 2/2013 | He et al. |
| 8,436,105 B2 | 5/2013 | Kohlstrung et al. |
| 8,470,928 B2 | 6/2013 | Schumann et al. |
| 8,513,347 B2 | 8/2013 | Tse et al. |
| 8,729,173 B2 | 5/2014 | Wang et al. |
| 10,329,417 B2 | 6/2019 | Gu |
| 10,329,418 B2 | 6/2019 | Gu |
| 10,329,419 B2 | 6/2019 | Gu |
| 2001/0018490 A1 | 8/2001 | Mashita et al. |
| 2003/0158336 A1 | 8/2003 | Yaguchi et al. |
| 2004/0036317 A1 | 2/2004 | Kleino |
| 2005/0266237 A1 | 12/2005 | Asthana et al. |
| 2007/0004830 A1 | 1/2007 | Flood et al. |
| 2007/0021560 A1 | 1/2007 | Tse et al. |
| 2007/0100060 A1 | 5/2007 | Tahri et al. |
| 2007/0117934 A1 | 5/2007 | He |
| 2007/0259141 A1 | 11/2007 | Ohki |
| 2008/0176969 A1 | 7/2008 | Tahri et al. |
| 2009/0012227 A1 | 1/2009 | Wang et al. |
| 2009/0108499 A1 | 4/2009 | Chrzanowski et al. |
| 2009/0275687 A1 | 11/2009 | Chrzanowski et al. |
| 2010/0021690 A1 | 1/2010 | McCarthy |
| 2010/0068452 A1 | 3/2010 | Kusanose |
| 2010/0210163 A1 | 8/2010 | He et al. |
| 2010/0314813 A1* | 12/2010 | Wojtowicki .......... C08L 53/025 267/141 |
| 2011/0034614 A1 | 2/2011 | Nakajima |
| 2011/0082225 A1 | 4/2011 | Qian et al. |
| 2011/0143112 A1 | 6/2011 | Cai |
| 2011/0184082 A1 | 7/2011 | Wright et al. |
| 2012/0037396 A1 | 2/2012 | Gu |
| 2012/0108691 A1 | 5/2012 | Meyer |
| 2012/0115998 A1 | 5/2012 | Schumann et al. |
| 2012/0136129 A1 | 5/2012 | Kohlstrung et al. |
| 2013/0202787 A1 | 8/2013 | Hu |
| 2013/0225020 A1 | 8/2013 | Flood et al. |
| 2016/0230000 A1 | 8/2016 | Gu |
| 2018/0022914 A1 | 1/2018 | Gu |
| 2018/0022915 A1 | 1/2018 | Gu |
| 2018/0030263 A1 | 2/2018 | Gu |
| 2018/0215910 A1 | 8/2018 | Venkataswamy et al. |

FOREIGN PATENT DOCUMENTS

| | | |
|---|---|---|
| JP | 3750459 B2 | 1/2006 |
| JP | 2010180325 A | 8/2010 |
| WO | 00/78860 A1 | 12/2000 |
| WO | 02/28965 A1 | 4/2002 |
| WO | 03/80692 A1 | 10/2003 |
| WO | 2014/194155 A1 | 12/2014 |

OTHER PUBLICATIONS

Chapman et al.: "High performance styrenic block copolymers in medical and damping applications," TPE Magazine, Jan. 2012, pp. 28-31.
Carvagno et al.: "Performance resins in tire compounding," Rubber World, Feb. 2014, 3 pages.
E.M. Petrie: "Selecting Tackifiers," SpecialChem, Oct. 3, 2012, 9 pages.
Jonas Öborn et al., "Styrene-Ethylene/Butylene-Styrene Blends for Improved Constrained-Layer Damping," Journal of Applied Polymer Science, vol. 80, pp. 2865-2876 (2001).
"Arkon P and M series" acquired from http://www.arakawa-usa.com/pdf/ARKON_PandMseries.PDF on Nov. 6, 2018.
"Kraton G (SEBS and SEBS OE)" acquired from http://kraton.com/products/KRATON_G.php on Nov. 6, 2018.
Leaversuch: "'Soft-on-soft' is newest option in soft-touch molding," Plastics Technology, dated Mar. 31, 2004.
Cray Valley datasheet on Wkingtack 95 resin (2016).

* cited by examiner

SUPER-VIBRATION DAMPING THERMOPLASTIC ELASTOMER BLENDS AND ARTICLES MADE THEREWITH

CLAIM OF PRIORITY

This application claims priority from U.S. Provisional Patent Application Ser. No. 62/366,561 and filed on Jul. 25, 2016, which is incorporated by reference.

FIELD OF THE INVENTION

This invention relates to thermoplastic elastomer formulations including blends of thermoplastic elastomers of different chemistries, which as blends exhibit synergistically superior damping properties, such as vibration, sound, and/or impact damping, across a broad range of temperatures, including at or above room temperature, and across a broad range of vibrational frequencies.

BACKGROUND OF THE INVENTION

Demand exists in a variety of applications for materials that exhibit damping properties. In general, damping is the dissipation of mechanical energy from a system. Damping can be important in applications such as electronics, sound isolation, automotive and transportation, building and construction, household appliances, industrial equipment, firearms, healthcare and medical devices, personal and/or sports protection, and military transportation, equipment, and protective gear. Indeed, damping or concussive energy suppression can be a matter of life and death in applications such as military, defense, and security, which can require blast mitigation and/or absorption of large amounts of energy with a wide range of vibrational frequencies to provide, for example, concussive energy suppression.

The capacity of a material for damping is related to its peak temperature of the tangent of delta ("tan delta peak temperature"), which can be determined by dynamic mechanical analysis (DMA) as described, for example, by M. P. Sepe in "Thermal Analysis of Polymers", *Rapra Review Reports*, Vol. 8, No. 11, 1997, which is incorporated herein by reference. The tangent of delta ("tan delta") of a material is the ratio of its loss modulus (E") to its storage modulus (E'). Consequently, as the value of tan delta increases, the response of the material is relatively more viscous than it is elastic, which thus provides greater damping. When graphically depicted against temperature or frequency at a given temperature, a tan delta curve includes a prominent peak at a particular temperature, which is called the tan delta peak temperature and also can be representative of or comparable to the glass transition temperature (Tg) of the material. In general, a material with a tan delta peak temperature which is relatively nearer to an application temperature, such as at or above room temperature, will possess better damping properties than a material with a tan delta peak temperature which is relatively lower or higher than the application temperature.

Thermoplastic elastomers (TPEs), which are polymer materials that exhibit elasticity while remaining thermoplastic, can be used for damping applications. Thermoplastic elastomers can include styrenic block copolymers (SBC), thermoplastic vulcanizates (TPV), thermoplastic olefins (TPO), copolyesters (COPE), thermoplastic urethanes (TPU), copolyamides (COPA), and olefinic block copolymer (OBC).

Some commercially available SBCs, such as high vinyl isoprene styrene block copolymers including HYBRAR 5127 available from Kuraray Co., Ltd., are known to exhibit vibration damping properties at room temperature. HYBRAR 5127 has a tan delta peak temperature that is reported to be 20° C. (i.e., about room temperature). Although HYBRAR 5127 can be formulated into conventional TPE compounds that exhibit effective room temperature damping, it is a relatively low molecular weight and non-hydrogenated material and cannot withstand processing at high temperatures required for some applications nor is it suitable for high temperature applications.

Other commercially available SBCs, such as HYBRAR 7125 available from Kuraray Co., Ltd., are hydrogenated and can withstand higher processing temperatures. However, the tan delta peak temperature of HYBRAR 7125 is reported to be −5° C. Disadvantageously, conventional TPE formulations based on HYBRAR 7125 do not possess satisfactory damping properties at room temperature.

U.S. Pat. No. 8,299,177 to Wright et al. discloses blends of certain different SBCs that are reported as exhibiting vibration damping properties. Namely, Wright discloses blends of controlled distribution block copolymer, such as KRATON A brand styrene-ethylene/butylene-styrene block copolymers with styrene in the mid-block available from Kraton Polymers, and styrene-isobutylene-styrene block copolymer, such as SIBSTAR brand polymers available from Kaneka. Although the SIBSTAR/Kraton A blends disclosed by Wright are reported to have high tan delta values of about 1, they also are reported to have tan delta peak temperatures no higher than 2° C., which is well below room temperature. As such, the SIBSTAR/Kraton A blends disclosed by Wright may have limited suitability for damping applications at or above room temperature.

SUMMARY OF THE INVENTION

Consequently, a need exists for TPE compounds that are capable of being processed at relatively high temperatures or suitable for applications at relatively high temperatures while also exhibiting increased useful damping properties, such as increased damping properties across a broad range of temperatures, including at or above room temperature, and across a broad range of vibrational frequencies.

The aforementioned needs are met by one or more aspects of the present invention.

Surprisingly, it has been found that, by adding styrene-isobutylene-styrene block copolymer to a thermoplastic elastomer compound including hydrogenated styrenic block copolymer having a polyisoprene soft block and high softening point tackifier, the Compound Tan Delta Peak Height can be increased relative to the Compound Tan Delta Peak Height for a thermoplastic elastomer compound that is the same except that it lacks styrene-isobutylene-styrene block copolymer. Such an increase in Compound Tan Delta Peak Height can be achieved while also maintaining the Compound Tan Delta Peak Temperature near a given temperature, such as at or above room temperature. With the thermoplastic elastomer compound of the present invention, it is possible to obtain increased damping capacity across a broad range of temperatures, including at or above room temperature, and across a broad range of vibrational frequencies.

One aspect of the invention is a thermoplastic elastomer compound that includes hydrogenated styrenic block copolymer having a polyisoprene soft block, styrene-isobutylene-styrene block copolymer, tackifier having a softening point of at least about 80° C. according to ASTM 6493, and, optionally, one or more additional thermoplastic elastomers selected from TPU, COPE, COPA, TPO, TPV, OBC, and combinations thereof. The compound has a Compound Tan Delta Peak Temperature (at 10 Hz) of at least 10° C. and a Compound Tan Delta Peak Height (at 10 Hz) of at least 0.85 if no additional thermoplastic elastomer is present and at least 0.60 if additional thermoplastic elastomer is present and includes TPU.

Another aspect of the invention is a plastic article formed from the aforementioned thermoplastic elastomer compound.

A further aspect of the invention is a multi-component plastic article including at least two components formed from different plastic materials and in which at least one of the different plastic materials is the aforementioned thermoplastic elastomer compound.

An even further aspect of the invention is a multi-portion plastic article, such as a multi-layer sheet or composite pad, including at least two portions each formed from the aforementioned thermoplastic elastomer compound.

Another aspect of the invention is a method for increasing the damping capacity of a thermoplastic elastomer compound which includes hydrogenated styrenic block copolymer having a polyisoprene soft block and high softening point tackifier by further including styrene-isobutylene-styrene block copolymer in the thermoplastic elastomer compound.

Another aspect of the invention is a combination of thermoplastic elastomer compound described above and commercially available impact mitigation and cushioning articles.

Features of the invention will become apparent with reference to the following embodiments. There exist various refinements of the features noted in relation to the above-mentioned aspects of the present invention. Additional features may also be incorporated in the above-mentioned aspects of the present invention. These refinements and additional features may exist individually or in any combination. For instance, various features discussed below in relation to any of the described aspects of the present invention may be incorporated into any of the described aspects of the present invention alone or in any combination.

One embodiment is explained with reference to the photos.

EMBODIMENTS OF THE INVENTION

In some embodiments, the present invention is directed to a thermoplastic elastomer compound that includes hydrogenated styrenic block copolymer having a polyisoprene soft block, styrene-isobutylene-styrene block copolymer, high softening point tackifier, and, optionally, one or more additional thermoplastic elastomers selected from TPU, COPE, COPA, TPO, TPV, OBC, and combinations thereof. In further embodiments, the present invention is directed to a plastic article formed from the aforementioned thermoplastic elastomer compound. In even further embodiments, the present invention is directed to a multi-component plastic article in which at least one plastic component is formed from the aforementioned thermoplastic elastomer compound. In yet further embodiments, the present invention is a multi-portion plastic article, such as a multi-layer sheet or composite pad, including at least two portions each formed from the aforementioned thermoplastic elastomer compound. Required and optional features of these and other embodiments of the present invention are described.

As used herein, the term "Compound Tan Delta Peak Height" means the value of Tan Delta for a compound at the Compound Tan Delta Peak Temperature for the compound.

As used herein, the term "Compound Tan Delta Peak Temperature" means the Tan Delta Peak Temperature for a compound.

As used herein, the term "Compound Tan Delta Peak Width" means, for a graphical depiction of Tan Delta against temperature for a compound as prepared for determining the Compound Tan Delta Peak Temperature ("the Tan Delta curve"), the approximate observed range from (a) the approximate temperature which is less than the Compound Tan Delta Peak Temperature and at which the slope of the Tan Delta curve predominantly changes from approximately zero (i.e., horizontal) to predominantly positive (i.e., directing upward from left to right), and (b) the approximate temperature which is greater than the Compound Tan Delta Peak Temperature and at which the slope of the Tan Delta curve predominantly changes from predominantly negative (i.e., directing downward from left to right) to approximately zero (i.e., horizontal).

As used herein, the term "Copolymer Tan Delta Peak Temperature" means the Tan Delta Peak Temperature for neat styrenic block copolymer; that is, for a styrenic block copolymer, itself, prior to combining it with any other ingredients of a compound.

As used herein, the term "essentially free of" a certain component means, in some embodiments, that no amount of that component is intentionally incorporated into a compound. In other embodiments, it means that less than 1 weight percent of the component is intentionally incorporated into the compound; and, in other embodiments, it means that less than 0.1 weight percent of the component is intentionally incorporated into the compound; and, in other embodiments, it means that less than 0.01 weight percent of the component is intentionally incorporated into the compound; and, in other embodiments, it means that less than 0.001 weight percent of the component is intentionally incorporated into the compound.

As used herein, the term "high softening point tackifier" means a tackifier having a softening point of at least 80° C. according to ASTM 6493.

As used herein, the term "softening point" means a material softening temperature as measured by a ring and ball type method according to ASTM 6493.

As used herein, the term "high vinyl" means that the vinyl content of a styrenic block copolymer (prior to hydrogenation) is greater than or equal to 50 mole percent. For example, more than 50 mole percent of the polybutadiene, if present in the soft block, is polymerized at the 1,2-position, and/or, more than 50 mole percent of the polyisoprene, if present in the soft block, is polymerized at the 3,4-position, both of which by driving the polymerization with addition of a polar compound, as is well known by those of ordinary skill in the art.

As used herein, the term "low vinyl" means that the vinyl content of a styrenic block copolymer (prior to hydrogenation) is less than 50 mole percent.

As used herein, the term "room temperature" means a range of temperature of a defined environment, usually an indoor environment, which is generally considered comfortable for human habitation, and, can include, for example, any temperature ranging from about 15° C. to about 26° C.

As used herein, the term "Tan Delta" means the tangent of delta of a material and is the ratio of the material's loss modulus (E") to the material's storage modulus (E').

As used herein, the term "Tan Delta Peak Temperature" means the temperature at which a prominent peak appears in a graphical depiction of Tan Delta against temperature for a material, as determined by dynamic mechanical analysis using TA Instruments Dynamic Mechanical Analysis Model Q800 in "shear sandwich" mode and for a temperature scan from −40° C. to 100° C. increasing at a rate of 5° C. per minute and with an oscillation frequency of 10 Hz.

As used herein, the term "vinyl", when describing a styrenic block copolymer, refers the vinyl content of the styrenic block copolymer prior to any hydrogenation. After hydrogenation, there is little or no vinyl unsaturation remaining. Nonetheless, such a styrenic block copolymer is still referred to as "vinyl" because it is derived from a vinyl precursor.

Thermoplastic Elastomer Compound

In some embodiments, the present invention is directed to a thermoplastic elastomer compound that includes hydrogenated styrenic block copolymer having a polyisoprene soft block, styrene-isobutylene-styrene block copolymer, high softening point tackifier, and, optionally, one or more additional thermoplastic elastomers selected from TPU, COPE, COPA, TPO, TPV, OBC, and combinations thereof.

It has been found that, by adding styrene-isobutylene-styrene block copolymer to a thermoplastic elastomer compound including hydrogenated styrenic block copolymer having a polyisoprene soft block and high softening point tackifier, the Compound Tan Delta Peak Height can be increased relative to the Compound Tan Delta Peak Height for a thermoplastic elastomer compound that is the same except that it lacks styrene-isobutylene-styrene block copolymer.

In some embodiments in which no additional thermoplastic elastomer is present, the compound has a Compound Tan Delta Peak Height of at least 0.85, or at least 0.90, or at least 0.95.

In other embodiments in which thermoplastic polyurethane is present as the additional thermoplastic elastomer, the compound has a Compound Tan Delta Peak Height of at least 0.60, or at least 0.65, or at least 0.70.

In some embodiments, the Compound Tan Delta Peak Temperature is at least 10° C. In other embodiments, the Compound Tan Delta Peak Temperature is at least room temperature. In further embodiments, the Compound Tan Delta Peak Temperature is greater than room temperature. In even further embodiments, the Compound Tan Delta Peak Temperature is from at least 10° C. to about 110° C., and, in other embodiments, from about 15° C. to about 55° C.

Hydrogenated Styrenic Block Copolymer

Thermoplastic elastomer compounds of the present invention include one or more hydrogenated styrenic block copolymers having a polyisoprene soft block.

Hydrogenated styrenic block copolymers having a polyisoprene soft block that are suitable for use in the present invention include any available hydrogenated styrenic block copolymers having a polyisoprene soft block that, when combined the high softening point tackifier and the styrene-isobutylene-styrene block copolymer can provide the thermoplastic elastomer compound with useful damping properties at the temperature of an intended end-use application, for example, at room temperature or temperatures higher or lower than room temperature. Suitable hydrogenated styrenic block copolymers having a polyisoprene soft block can be selected also to provide other properties desirable for the end-use application. The present invention contemplates the use of a single type of hydrogenated styrenic block copolymer having a polyisoprene soft block or combinations of two or more different types of hydrogenated styrenic block copolymers having a polyisoprene soft block.

In some embodiments, the hydrogenated styrenic block copolymer is at least partially hydrogenated. In other embodiments, the hydrogenated styrenic block copolymer is fully hydrogenated.

It is to be understood that an isoprene soft block that is hydrogenated is converted to an ethylene/propylene soft block. Similarly, it is to be understood that a butadiene soft block that is hydrogenated is converted to an ethylene/butylene soft block.

In some embodiments, the polyisoprene soft block of the hydrogenated styrenic block copolymer is a vinyl-polyisoprene soft block.

In some embodiments, suitable hydrogenated styrenic block copolymers have a relatively low weight average molecular weight. In other embodiments, suitable styrenic block copolymers have a relatively high weight average molecular weight. For example, suitable styrenic block copolymers can have weight average molecular weights in excess of 75,000 and preferably in excess of 200,000. In some embodiments, the hydrogenated styrenic block copolymer has a weight average molecular weight ranging from about 75,000 to about 1 million or from about 75,000 to about 500,000. In other embodiments, the styrenic block copolymer has a weight average molecular weight ranging from about 200,000 to about 1 million or from about 200,000 to about 500,000.

The hydrogenated styrenic block copolymer has a Copolymer Tan Delta Peak Temperature. In some embodiments, the hydrogenated styrenic block copolymer has a Copolymer Tan Delta Peak Temperature of less than 10° C. In other embodiments, the styrenic block copolymer has a Copolymer Tan Delta Peak Temperature that is greater than about −40° C.

It is believed that the high softening point tackifier is more effective at shifting the Copolymer Tan Delta Peak Temperature to a higher temperature for hydrogenated styrenic block copolymers having a Copolymer Tan Delta Peak Temperature that is greater than about −40° C. In some embodiments, the thermoplastic elastomer compound is essentially free of styrenic block polymers having a Copolymer Tan Delta Peak Temperature that is less than about −40° C. In other embodiments, the thermoplastic elastomer compound is essentially free of styrene-(ethylene-ethylene/propylene)-styrene block copolymer or low vinyl styrene-(ethylene/butylene)-styrene block copolymer or both. Some standard or low vinyl styrenic block copolymers, such as those available under the SEPTON brand from Kuraray Co., Ltd. and including SEPTON 4000 Series SEEPS copolymers, typically have a Copolymer Tan Delta Peak Temperature that is less than about −40° C.

Examples of commercially available hydrogenated styrenic block copolymers having a polyisoprene soft block which are suitable for use in the present invention include one or more of the HYBRAR brand of styrenic block copolymers from Kuraray, Co. Ltd., such as grades KL-7125 and KL-7135.

HYBRAR KL-7125 copolymer is reported by the manufacturer as having a Tan Delta Peak Temperature of −5° C., a Shore A hardness of 64, a tensile elongation of 680%, and a melt flow rate (MFR) of 4 g/10 min at 230° C. with a 2.16 kg weight.

HYBRAR KL-7135 copolymer, which has a relatively higher molecular weight than that of HYBRAR KL-7125 copolymer but is similar in chemical structure, is reported by the manufacturer as having a Tan Delta Peak Temperature of +1° C., a Shore A hardness of 68, and a tensile elongation of 550%. Because of the higher molecular weight, MFR is not measurable at 230° C. and a 2.16 kg weight.

Styrene-Isobutylene-Styrene Block Copolymer

Thermoplastic elastomer compounds of the present invention include one or more styrene-isobutylene-styrene block copolymer.

Styrene-isobutylene-styrene block copolymers that are suitable for use in the present invention include any available styrene-isobutylene-styrene block copolymer that, when combined the high softening point tackifier and the styrenic block copolymer having a polyisoprene soft block can provide the thermoplastic elastomer compound with useful damping properties at the temperature of an intended end-use application, for example, at room temperature or temperatures higher or lower than room temperature. Suitable styrene-isobutylene-styrene block copolymer can be selected also to provide other properties desirable for the end-use application. The present invention contemplates the use of a single type of styrene-isobutylene-styrene block copolymer or combinations of two or more different types of styrene-isobutylene-styrene block copolymer.

Examples of commercially available styrene-isobutylene-styrene block copolymers include those available under the SIBSTAR brand from Kaneka.

High Softening Point Tackifier

Thermoplastic elastomer compounds of the present invention include one or more high softening point tackifiers.

By adding high softening point tackifier to styrenic block copolymer, the Copolymer Tan Delta Peak Temperature of the styrenic block copolymer can be shifted to a higher temperature (i.e., the Compound Tan Delta Peak Temperature).

High softening point tackifiers that are suitable for use in the present invention have a softening point of at least about 80° C. according to ASTM 6493. In some embodiments, the softening point is at least 100° C., and, in other embodiments, at least about 120° C., and, in further embodiments, at least about 140° C. In even further embodiments, the softening point ranges from about 80° C. to about 150° C.

Suitable high softening point tackifiers include those derived from rosin feedstock, terpene feedstock, or hydrocarbon feedstock. Hydrocarbon-based high softening point tackifiers can be aliphatic or aromatic, and saturated or unsaturated.

Examples of commercially available high softening point tackifiers include hydrogenated hydrocarbon resins available under the ARKON brand, such as grades P100, P115, P125, and P140, from Arakawa Chemical Industries. Ltd., hydrogenated hydrocarbon resins available under the EASTOTAC brand, such as grades H-125-W, H-140-W, and H-142-W, from Eastman Chemical Company; hydrogenated hydrocarbon resins available under the PLASTOLYN brand, such as grade R1140, from Eastman Chemical Company; and hydrogenated hydrocarbon resins available under the REGALREZ brand, such as grade 1139, from Eastman Chemical Company.

In some embodiments, the high softening point tackifier includes an amorphous hydrocarbon resin derived from aromatic hydrocarbon feedstock. In further embodiments, the high softening point tackifier is fully hydrogenated and has a saturated cyclo-aliphatic structure.

In some embodiments, the high softening point tackifier has a weight average molecular weight ranging from about 400 to about 3,500. In other embodiments, the high softening point tackifier has a weight average molecular weight ranging from about 1,000 to about 2,000.

High softening point tackifier is included in the thermoplastic elastomer compound of the present invention in amount ranging from about 20 parts by weight to about 200 parts by weight, per 100 parts by weight of the styrenic block copolymer. In some embodiments, the amount of high softening point tackifier ranges from about 30 parts by weight to about 150 parts by weight, per 100 parts by weight of the styrenic block copolymer.

It is believed that, in general, a relatively higher proportion of high softening point tackifier is required to shift the Tan Delta Peak Temperature to a higher temperature for styrenic block copolymer having a relatively higher molecular weight. Conversely, it is believed that, in general, a relatively lower proportion of high softening point tackifier is required to shift the Tan Delta Peak Temperature to a higher temperature for styrenic block copolymer having a relatively lower molecular weight.

Care should be taken to ensure that the thermoplastic elastomer compound of the present invention is formulated to provide properties desirable for a TPE compound and not properties more commonly observed in adhesive compositions. Generally, adhesive compositions are different from TPE compounds at least because adhesive compositions typically are relatively low viscosity compositions which do not possess the useful mechanical properties of TPE compounds. Accordingly, even if up to about 200 parts by weight of high softening point tackifier is used per 100 parts by weight of styrenic block copolymer, the thermoplastic elastomer compound of the present invention is not an adhesive composition. For example, the thermoplastic elastomer compound is not tacky, or it is not sticky to the touch of a human hand.

Optional Additional Thermoplastic Elastomer

In some embodiments, the thermoplastic elastomer compound further includes one or more optional additional thermoplastic elastomers which are based on different chemistries than those of the hydrogenated styrenic block copolymer having a polyisoprene soft block and the styrene-isobutylene-styrene block copolymer.

Suitable additional thermoplastic elastomers include thermoplastic polyurethanes (TPU), copolyesters (COPE), copolyamides (COPA), thermoplastic olefins (TPO), thermoplastic vulcanizates (TPV), olefinic block copolymers (OBC), and combinations thereof. The additional thermoplastic elastomer can be used, for example, to adjust physical and mechanical properties of the thermoplastic elastomer compound.

In some embodiments, the additional thermoplastic elastomer includes TPU. Any conventional TPU can be used in the present invention. Examples of commercially available TPUs include those available under the ELASTOLLAN brand from BASF, such as ELASTOLLAN S85A55N thermoplastic polyurethane.

Optional Plasticizer

In some embodiments, the thermoplastic elastomer compound further includes plasticizer. Plasticizer can be used, for example, to adjust softness and/or improve flow or other properties of the thermoplastic elastomer compound.

Any conventional oil capable of plasticizing styrenic block copolymer, such as mineral oil, vegetable oil, synthetic oil, etc., can be used in the present invention. Examples of commercially available oils include those available under the PURETOL 380 brand from Petro-Canada. and those available under the PRIMOL 382 brand from ExxonMobil.

In some embodiments, plasticizers with a higher molecular weight than that of the aforementioned conventional oils can be used. Polyisobutene (PIB) is an example of such a plasticizer with a relatively higher molecular weight. For example, medium- to high-molecular weight PIB is commercially available under the OPPANOL brand from BASF and under the INDOPOL brand from Ineos.

Optional Filler

In some embodiments, the thermoplastic elastomer compound further includes inorganic filler.

Inorganic filler can be used, for example, to lower the cost and/or control properties of the thermoplastic elastomer compound. In other embodiments, the inorganic filler also can be used, for example, as a mineral filler flame retardant.

Non-limiting examples of inorganic fillers include iron oxide, zinc oxide, magnesium oxide, titanium oxide, zirconium oxide, titanium dioxide, alumina, silica, silica-alumina, aluminum hydroxide, magnesium hydroxide, calcium hydroxide, magnesium carbonate, calcium carbonate (heavy, light, colloidal), barium sulfate, calcium sulfate, sodium sulfate, calcium sulfite, calcium silicate, calcium phosphate, magnesium phosphate, talc, mica, kaolin, clay, wollastonite, hydrotalcite, glass beads, glass powders, silica sand, silica rock, silicon nitride, quartz powder, volcanic pumice, diatomaceous earth, white carbon, iron powder and aluminum powder.

In some embodiments, the inorganic filler is calcium carbonate, talc, or mixtures thereof.

Optional Non-Elastomeric Secondary Polymer

In some embodiments, the thermoplastic elastomer compound further includes non-elastomeric secondary polymer. Secondary polymer should be compatible with the styrenic block copolymer and can, for example, contribute to improved processability or desirable physical properties, such as hardness, in the thermoplastic elastomer compound.

Suitable secondary polymer includes polyolefin-based resins, including homopolymers, copolymers, blends of polymers, mixtures of polymers, alloys of polymers, and combinations thereof.

Non-limiting examples of polyolefins suitable for use in the present invention include polyethylene (including low-density (LDPE), high-density (HDPE), ultra-high molecular weight (UHDPE), linear-low-density (LLDPE), very-low density, etc.), malcated polypropylene, polypropylene, polybutylene, polyhexalene, polyoctene, and copolymers thereof, and ethylene-vinyl-acetate (EVA) copolymer. In some embodiments, high density polyethylene (HDPE) and/or polypropylene (PP) are preferred. Such polyolefins are commercially available from a number of sources.

Suitable secondary polymer also includes polyphenylene ethers (PPE). Non-limiting examples of types of PPE, sometimes also referred to as polyphenylene oxide, can include poly(2,6-dimethyl-1,4-phenylene ether), poly(2,6-diethyl-1,4-phenylene ether), poly(2-methyl-6-ethyl-1,4-phenylene ether), poly(2-methyl-6-propyl-1,4-phenylene ether), poly(2,6-dipropyl-1,4-phenylene ether), poly(2-ethyl-6-propyl-1,4-phenylene ether), poly(2,6-dimethoxy-1,4-phenylene ether), poly(2,6-di(chloro methyl)-1,4-phenylene ether), poly(2,6-di(bromo methyl)-1,4-phenylene ether), poly(2,6-diphenyl-1,4-phenylene ether), poly(2,6-ditoluyl-1,4-phenylene ether), poly(2,6-dichloro-1,4-phenylene ether), poly(2,6-dibenzyl-1,4-phenylene ether), poly(2,5-dimethyl-1,4-phenylene ether), and combinations thereof.

Optional Bonding Agent

In some embodiments in which the thermoplastic elastomer compound is overmolded onto a thermoplastic substrate, the thermoplastic elastomer compound further includes at least one bonding agent.

For embodiments in which the thermoplastic substrate is polyamide (nylon), suitable bonding agents include maleic anhydride functionalized polymers, such as maleic anhydride functionalized polyolefin and maleic anhydride functionalized styrenic block copolymer. For example, suitable maleic anhydride functionalized polyolefins are described in U.S. Pat. No. 7,842,747 to Gu et al., which is incorporated herein by reference.

Examples of commercially available maleic anhydride functionalized polyolefin include those available under the EXXELOR brand from ExxonMobil Chemical; those available under the POLYBOND brand from Addivant; and those available under the FUSABOND brand from DuPont.

Examples of commercially available maleic anhydride functionalized styrenic block copolymer include those available under the KRATON FG brand, such as grades FG1901 and FG1924, from Kraton Performance Polymers Inc.

For embodiments in which the thermoplastic substrate is a polyolefin such as polypropylene, suitable bonding agents include compatible polyolefins such as those described above as secondary polymers, including polypropylene. Commercially available examples include polypropylene available under the BRASKEM H521 brand from Braskem America Inc.

For embodiments in which the thermoplastic substrate is a another thermoplastic material such as thermoplastic polyurethane (TPU), polycarbonate (PC), polycarbonate/acrylonitrile butadiene styrene (PC/ABS), and polybutylene terephthalate/polycarbonate (PBT/PC), suitable bonding agents include compatible polymers such as TPU or copolyester elastomer (COPE) or blends of TPU/COPE. Commercially available examples include TPU available under the ELASTOLLAN brand from BASF.

Other Optional Additives

In some embodiments, the thermoplastic elastomer compound further includes one or more conventional plastics additives in an amount that is sufficient to obtain a desired processing or performance property for the compound. The amount should not be wasteful of the additive nor detrimental to the processing or performance of the compound. Those skilled in the art of thermoplastics compounding, without undue experimentation but with reference to such treatises as *Plastics Additives Database* (2004) from Plastics Design Library (elsevier.com), can select from many different types of additives for inclusion into the compounds of the present invention.

Non-limiting examples of optional additives that can be included in the thermoplastic elastomer compounds of the present invention include adhesion promoters; biocides; anti-fogging agents; anti-static agents; blowing and foaming agents; bonding agents and bonding polymers; dispersants;

flame retardants and smoke suppressants; impact modifiers; initiators; lubricants; micas; pigments, colorants and dyes; processing aids; release agents; silanes, titanates and zirconates; slip and anti-blocking agents; stabilizers; stearates; ultraviolet light absorbers; viscosity regulators; waxes; and combinations of any of the aforementioned additives.

In some embodiments, the thermoplastic elastomer compound further includes a physical foaming agent, such as carbon dioxide, nitrogen, or air, and/or a chemical foaming agent, such as organic or inorganic compounds that release gases upon decomposition, and can be injection molded or extruded into a foamed TPE material.

Ranges of Ingredients in the TPE Compounds

Table 1 below shows the acceptable, desirable, and preferable ranges of ingredients for the thermoplastic elastomer compound of the present invention, based on 100 parts by weight of the hydrogenated styrenic block copolymer included in the thermoplastic elastomer compound.

The thermoplastic elastomer compound of the present invention can comprise, consist essentially of, or consist of these ingredients. Any number between the ends of the ranges is also contemplated as an end of a range, such that all possible combinations are contemplated within the possibilities of Table 1 as embodiments of compounds for use in the present invention. Unless expressly stated otherwise herein, any disclosed number is intended to refer to exactly the disclosed number, "about" the disclosed number, or both exactly the disclosed number and "about" the disclosed number.

TABLE 1

Thermoplastic Elastomer Compound
(parts by weight per 100 parts by weight of HSBC)

| Ingredient | Acceptable | Desirable | Preferable |
| --- | --- | --- | --- |
| Hydrogenated Styrenic Block Copolymer | 100 | 100 | 100 |
| Styrene-Isobutylene-Styrene Block Copolymer | 50 to 500 | 100 to 450 | 250 to 400 |
| High Softening Point Tackifier | 20 to 200 | 30 to 170 | 35 to 140 |
| Optional Additional Thermoplastic Elastomer | 0 to 400 | 0 to 200 | 0 to 100 |
| Optional Plasticizer | 0 to 200 | 20 to 150 | 40 to 100 |
| Optional Filler | 0 to 150 | 0 to 100 | 0 to 80 |
| Optional Non-Elastomeric Secondary Polymer | 0 to 300 | 0 to 200 | 0 to 150 |
| Optional Bonding Agent | 0 to 300 | 0 to 200 | 0 to 150 |
| Optional Other Additives | 0 to 100 | 0 to 80 | 0 to 50 |

In some embodiments, the weight ratio of styrene-isobutylene-styrene block copolymer to hydrogenated styrenic block copolymer is about 3.3:1 or greater. In other embodiments, the weight ratio of styrene-isobutylene-styrene block copolymer to hydrogenated styrenic block copolymer is about 1:1 or greater.

In further embodiments, the thermoplastic elastomer compound can include less than 30 weight percent of high softening point tackifier based on total weight of the compound. In even further embodiments, the thermoplastic elastomer compound can include less than 28 weight percent of high softening point tackifier based on total weight of the compound.

Processing

The preparation of thermoplastic elastomer compounds of the present invention is uncomplicated once the proper ingredients have been selected. The compound of the present can be made in batch or continuous operations.

Mixing in a continuous process typically occurs in an extruder that is elevated to a temperature that is sufficient to melt the polymer matrix with addition of all additives at the feed-throat, or by injection or side-feeders downstream. Extruder speeds can range from about 200 to about 700 revolutions per minute (rpm), and preferably from about 300 rpm to about 500 rpm. Typically, the output from the extruder is pelletized for later extrusion, molding, thermoforming, foaming, calendering, and/or other processing into polymeric articles.

Subsequent extrusion, molding, thermoforming, foaming, calendering, and/or other processing techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.elsevier.com), one can make articles of any conceivable shape and appearance using compounds of the present invention.

Usefulness of the Invention

Because of its usefulness and versatility, the thermoplastic elastomer compound of the present invention has potential for a variety of damping applications in many different industries, including but not limited to: automotive and transportation; household appliances; industrial equipment; electronics; acoustics; communications; healthcare and medical; defense; firearms; security; personal safety; sports protection; and other industries or applications benefiting from the compound's unique combination of properties.

With a capability of providing superior damping capacity across a broad range of temperatures including at or above room temperature and across a broad range of frequencies, the thermoplastic elastomer compound of the present invention is especially suitable for military, defense, and/or security applications which require blast mitigation and/or absorption of large amounts of energy with a wide range of vibrational frequencies to provide, for example, concussive energy suppression.

As discussed above, it has been found that, by adding styrene-isobutylene-styrene block copolymer to a thermoplastic elastomer compound including hydrogenated styrenic block copolymer having a polyisoprene soft block and high softening point tackifier, the Compound Tan Delta Peak Height can be increased relative to the Compound Tan Delta Peak Height for a thermoplastic elastomer compound that is the same except that it lacks styrene-isobutylene-styrene block copolymer. Such an increase in Compound Tan Delta Peak Height can be achieved while also maintaining the Compound Tan Delta Peak Temperature near a given temperature, such as at or above room temperature. Furthermore, with the thermoplastic elastomer compound of the present invention, it is possible to obtain increased damping capacity across a broad range of vibrational frequencies.

Accordingly, thermoplastic elastomer compounds of the present invention can be used for any plastic article or any component of a multi-component plastic article or portion of a multi-portion plastic article which needs physical properties of a TPE, such as flexibility, elongation, and/or a soft or silky feel, while also advantageously providing improved useful damping capacity for applications across a broad range of temperatures, including at or above room temperature, and across a broad range of vibrational frequencies.

In some embodiments, the present invention is directed to a plastic article formed from the thermoplastic elastomer compound as described herein.

In other embodiments, the present invention is directed to a multi-component plastic article which includes at least two components formed from different plastic materials one of which is the thermoplastic elastomer compound as described herein. Embodiments of such multi-component plastic articles include, for example, a thermoplastic substrate onto which the thermoplastic elastomer compound as described herein is overmolded, or a fiber-reinforced plastic onto which the thermoplastic elastomer compound as described herein is laminated.

In further embodiments, the present invention is directed to a multi-portion plastic article comprising at least two portions, wherein each of the at least two portions is formed from the thermoplastic elastomer compound as described herein. In some embodiments of the multi-portion plastic article, at least one of the at least two portions is formed from a first formulation of the thermoplastic elastomer compound as described herein and at least one other of the at least two portions is formed from a second formulation of the thermoplastic elastomer compound as described herein.

In even further embodiments, the plastic article of the present invention is in the form of a sheet or pad.

In other embodiments, the plastic articles of the present invention, including components of the multi-component plastic article, or portions of the multi-portion plastic article, can be shaped from the TPE compound by molding, extruding, thermoforming, laminating, calendering, blow molding, and via additive 3-D manufacturing.

In further embodiments, the present invention is directed to a method for increasing the damping capacity of a thermoplastic elastomer compound which includes hydrogenated styrenic block copolymer having a polyisoprene soft block and high softening point tackifier by further including styrene-isobutylene-styrene block copolymer in the thermoplastic elastomer compound.

If desirable for any application, the thermoplastic elastomer compound can be overmolded or laminated onto a substrate. In some embodiments, the substrate is a thermoplastic substrate such as polyamide (nylon) or polyolefin (e.g., polypropylene) or another thermoplastic material such as thermoplastic polyurethane (TPU), polycarbonate (PC), polycarbonate/acrylonitrile butadiene styrene (PC/ABS), or polybutylene terephthalate/polycarbonate (PBT/PC). In other embodiments, the substrate is a fiber-reinforced plastic. Fiber-reinforced plastics typically include fibers, such as glass fibers, carbon fibers, aramid fibers, and the like, in a matrix of a polymer resin, such as a thermoplastic resin or a thermoset resin.

In further embodiments, the thermoplastic elastomer compound can be adhered or otherwise associated with impact mitigation structures to form an article having the benefits of both the engineered impact mitigation article and the vibration damping properties of the thermoplastic elastomer compound.

EXAMPLES

Non-limiting examples of thermoplastic elastomer compounds of various embodiments of the present invention are provided.

Table 2 below shows sources of ingredients for the thermoplastic elastomer compounds of Comparative Examples A to F and Examples 1 to 4.

TABLE 2

| Ingredient | Brand | Source |
|---|---|---|
| Styrene-(ethylene/propylene)-styrene block copolymer | SEPTON 2005 | Kuraray |
| Non-hydrogenated low molecular weight styrene isoprene block copolymer | HYBRAR 5127 | Kuraray |
| Hydrogenated styrenic block copolymer having vinyl-polyisoprene soft block | HYBRAR 7135 | Kuraray |
| Styrene-isobutylene-styrene block copolymer | SIBSTAR T103 | Kaneka |
| High softening point tackifier hydrogenated hydrocarbon resin | PLASTOLYN R1140 | Eastman Chemical |
| Thermoplastic polyurethane | ELASTOLLAN S85A55N | BASF |
| White mineral oil | 380 vis USP white oil | (numerous) |
| High density polyethylene resin | SCLAIR 2908 | NOVA Chemicals |
| Calcium carbonate (limestone) filler | VICRON 25-11 | Specialty Minerals |

Table 3 below shows the formulations and certain properties of Comparative Examples A to E.

TABLE 3

| | Example | | | | | |
|---|---|---|---|---|---|---|
| | A | | B | | C | |
| | Parts | Wt. % | Parts | Wt. % | Parts | wt. % |
| Ingredient | | | | | | |
| HYBRAR 5127 | 80 | 48.5 | 80 | 24.2 | 80 | 16.2 |
| SIBSTAR T103 | 0 | 0 | 165 | 50.0 | 165 | 33.3 |
| SEPTON 2005 | 55 | 33.3 | 55 | 16.7 | 55 | 11.1 |
| ELASTOLLAN S85A55N | 0 | 0 | 0 | 0 | 165 | 33.3 |
| 380 vis USP white oil | 30 | 18.2 | 30 | 9.1 | 30 | 6.1 |
| TOTAL | 165 | 100.0 | 330 | 100.0 | 495 | 100.0 |
| Properties | | | | | | |
| Hardness (Shore A) | | 32 | | 44 | | 57 |
| Compound Tan Delta Peak Temperature (° C.) | | 22 | | 30 | | 32 |
| Compound Tan Delta Peak Height (unitless) | | 1.1 | | 0.6 | | 0.45 |

TABLE 3-continued

| | | | |
|---|---|---|---|
| Compound Tan Delta Peak Width (° C.) | 0 to 50 | 10 to 60 | 10 to 60 |
| Compression Set (70° C., 22 hours; ASTM D395) | 100 | 87 | 90 |

| | Example | | | |
|---|---|---|---|---|
| | D | | E | |
| | Parts | Wt. % | Parts | Wt. % |
| Ingredient | | | | |
| HYBRAR 5127 | 80 | 32.7 | 80 | 24.6 |
| SIBSTAR T103 | 80 | 32.7 | 80 | 24.6 |
| SEPTON 2005 | 55 | 22.4 | 55 | 16.9 |
| ELASTOLLAN S85A55N | 0 | 0 | 80 | 24.6 |
| 380 vis USP white oil | 30 | 12.2 | 30 | 9.2 |
| TOTAL | 245 | 100.0 | 325 | 100.0* |
| Properties | | | | |
| Hardness (Shore A) | | 37 | | 47 |
| Compound Tan Delta Peak Temperature (° C.) | | 25 | | 28 |
| Compound Tan Delta Peak Height (unitless) | | 0.7 | | 0.53 |
| Compound Tan Delta Peak Width (° C.) | | 0 to 60 | | 0 to 60 |
| Compression Set (70° C., 22 hours; ASTM D395) | | 87 | | 100 |

*Weight percent values are rounded, so totals may not equal 100%.

Comparative Example A is representative of a conventional TPE compound based on a blend of HYBRAR 5127 and SEPTON 2005.

Comparative Examples B and D differ from Comparative Example A in that Comparative Examples B and D each additionally include SIBSTAR T103 styrene-isobutylene-styrene block copolymer.

Notably, the addition of styrene-isobutylene-styrene block copolymer causes the Compound Tan Delta Peak Height to decrease from 1.1 for Comparative Example A to 0.6 for Comparative Example B and 0.7 for Comparative Example D, which implies a decrease in damping capacity for Comparative Examples B and D relative to that for Comparative Example A.

Comparative Examples C and E differ from Comparative Example A in that Comparative Examples C and E each additionally include SIBSTAR T103 styrene-isobutylene-styrene block copolymer and ELASTOLLAN S85A55N thermoplastic polyurethane. Comparative Examples C and E each have a lower Compound Tan Delta Peak Height than that for Comparative Example A as well as that for each of Comparative Examples B and D. The addition of thermoplastic polyurethane decreases the damping capacity of the compound.

As demonstrated by Comparative Examples A to E, the addition of styrene-isobutylene-styrene block copolymer and optionally thermoplastic polyurethane to a blend of conventional SBCs decreases the damping capacity of the compound.

Table 4 below shows the formulations and certain properties of Comparative Example F and Examples 1 to 4.

TABLE 4

| | Example | | | | | |
|---|---|---|---|---|---|---|
| | F | | 1 | | 2 | |
| | Parts | Wt. % | Parts | Wt. % | Parts | Wt. % |
| Ingredient | | | | | | |
| HYBRAR 7135 | 100 | 30.8 | 100 | 15.4 | 100 | 10.3 |
| SIBSTAR T103 | 0 | 0 | 325 | 50.0 | 325 | 33.3 |
| PLASTOLYN R1140 | 80 | 24.6 | 80 | 12.3 | 80 | 8.2 |
| ELASTOLLAN S85A55N | 0 | 0 | 0 | 0 | 325 | 33.3 |
| 380 vis USP white oil | 80 | 24.6 | 80 | 12.3 | 80 | 8.2 |
| SCLA1R 2908 | 35 | 10.8 | 35 | 5.4 | 35 | 3.6 |
| VICRON 25-11 | 30 | 9.2 | 30 | 4.6 | 30 | 3.1 |
| TOTAL | 325 | 100.0 | 650 | 100.0* | 975 | 100.0* |
| Properties | | | | | | |
| Hardness (Shore A) | | 30 | | 33 | | 52 |
| Compound Tan Delta Peak Temperature (° C.) | | 25 | | 18 | | 12 |

TABLE 4-continued

| | | | |
|---|---|---|---|
| Compound Tan Delta Peak Height (unitless) | 0.75 | 0.95 | 0.65 |
| Compound Tan Delta Peak Width (° C.) | −20 to 60 | −25 to 65 | −20 to 60 |
| Compression Set (70° C., 22 hours; ASTM D395) | 35 | 64 | 74 |

| | Example | | | |
|---|---|---|---|---|
| | 3 | | 4 | |
| | Parts | Wt. % | Parts | Wt. % |
| Ingredient | | | | |
| HYBRAR 7135 | 100 | 23.5 | 100 | 19.1 |
| SIBSTAR T103 | 100 | 23.5 | 100 | 19.1 |
| PLASTOLYN R1140 | 80 | 18.8 | 80 | 15.2 |
| ELASTOLLAN S85A55N | 0 | 0 | 100 | 19.1 |
| 380 vis U SP white oil | 80 | 18.8 | 80 | 15.2 |
| SCLAIR 2908 | 35 | 8.2 | 35 | 6.7 |
| VICRON 25-11 | 30 | 7.1 | 30 | 5.7 |
| TOTAL | 425 | 100.0* | 525 | 100.0* |
| Properties | | | | |
| Hardness (Shore A) | | 29 | | 40 |
| Compound Tan Delta Peak Temperature (° C.) | | 26 | | 22 |
| Compound Tan Delta Peak Height (unitless) | | 0.9 | | 0.7 |
| Compound Tan Delta Peak Width (° C.) | | −25 to 65 | | −25 to 65 |
| Compression Set (70° C., 22 hours; ASTM D395) | | 65 | | 74 |

*Weight percent values are rounded, so totals may not equal 100%.

Comparative Example F is representative of a damping TPE compound based on the principle that addition of high softening point tackifier such as PLASTOLYN R1140 to certain styrenic block copolymer such as HYBRAR 7135 shifts the Copolymer Tan Delta Peak Temperature of the styrenic block copolymer to a higher temperature (i.e., the Compound Tan Delta Peak Temperature), as described in commonly owned U.S. Provisional Application Ser. No. 62/114,701, filed Feb. 11, 2015, the subject matter of which is hereby incorporated by reference. With this approach, the damping capacity of the styrenic block copolymer can be increased for an intended end-use application at a given temperature, such as at or above room temperature. However, further increases in damping capacity would be beneficial.

Examples 1 and 3 differ from Comparative Example F in that Examples 1 and 3 each additionally include SIBSTAR T103 styrene-isobutylene-styrene block copolymer.

Surprisingly, and in contrast to the results observed with Comparative Examples A, B, and D, the addition of styrene-isobutylene-styrene block copolymer synergistically causes the Compound Tan Delta Peak Height to increase from 0.75 for Comparative Example F to 0.95 for Example 1 and 0.9 for Example 3, which implies an increase in damping capacity for Examples 1 and 3 relative to that for Comparative Example F.

Examples 2 and 4 differ from Comparative Example F in that Examples 2 and 4 each additionally include SIBSTAR T103 styrene-isobutylene-styrene block copolymer and ELASTOLLAN S85A55N thermoplastic polyurethane. As would be expected, the addition of thermoplastic polyurethane causes a decrease in Compound Tan Delta Peak Height for Examples 2 and 4 relative to that for Comparative Example F as well as each of Examples 1 and 3. Although, advantageously, the Compound Tan Delta Peak Height for each of Example 2 (0.65) and Example 4 (0.7) is greater than that for each of Comparative Example C (0.45) and Comparative Example E (0.53). Therefore, unexpectedly, the present invention provides increased damping capacity for TPE compounds which include thermoplastic polyurethanes.

Table 5 shows a formulation of the TPE compound which was formed into a 0.1875 inch (0.47625 cm) thick foamed sheet by including in the extruder operating at 375-400° F. (190-204° C.) of six weight percent of Expancel (Akzo Nobel) foaming agent to form a closed cell foamed sheet 0.1875 inches (0.47625 cm) thick.

TABLE 5

| | Example 5 | |
|---|---|---|
| Ingredient | Parts | Wt. % |
| HYBRAR 7125F | 100 | 15.28 |
| SIBSTAR T103-F | 325 | 49.65 |
| PLASTOLYN R1140 | 80 | 12.22 |
| 380 vis USP white oil | 80 | 12.22 |
| VICRON 25-11 | 30 | 4.58 |
| H521 Polypropylene (Braskem) | 30 | 4.58 |
| Crodamide VRX (bead) (Croda) | 3 | 0.46 |
| UV 62 Succinate HALS (Sabo) | 2.3 | 0.35 |
| Tinuvin 234 (BASF) | 2.30 | 0.35 |
| Irganox 1010 (BASF) | 1.3 | 0.20 |
| Irgafos 168 (BASF) | 0.70 | 0.11 |
| TOTAL | 654.6 | 100.0* |

Table 6 shows unexpected results when using the foamed version of Example 5 as a top sheet with an impact mitigation structure to form an article for blast mitigation purposes. The test measures Gravitational Force or "G Force", the amount of acceleration with 1 G being equal to the force of gravity at the Earth's surface, which is 9.8 meters per second per second. The test conducted, in a manner similar to Thom et al., "MOTORCYCLE HELMET TEST HEADFORM AND TEST APPARATUS COMPARISON" Paper Number 98-S10-P-29 (Head Protection Research Laboratory of NHTSA, U.S. Department of Transportation) had the following parameters:

Chin Bar Impactor-4310 G's; Striking a Flat anvil on Monorail drop tower; A load cell placed on chin bar impactor; Drop Height was 50 cm-350 cm, in 50 cm increments; Measurement time after impact—75 seconds; and Response measured was G-force (peak g)

FIGS. 1-4 depict four different candidates for impact mitigation. All four were 5 inches×5 inches (12.7×12.7 cm) in area and 1.25; 1.0; 1.125; and 1.1875 inches thick, respectively (3.175; 2.54; 2.86; and 3.01 cm, respectively).

Figure 1:
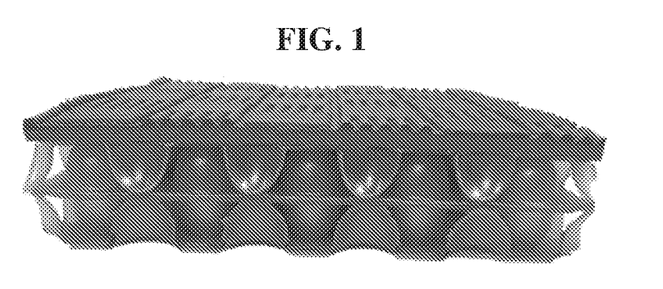
FIG. 1 is a photo of a boat deck sheet manufactured by Skydex Technologies, Inc.

FIG. 1, depicts a boat deck sheet made by Skydex Technologies, Inc., reportedly having independent testing which showed protection from wave slam impact by reducing the peak g-forces by 90% when compared to the United States Navy SEAL's incumbent material. A White Paper available at the web site for Skydex Technologies, Inc. indicates that the product can be regarded as an "advanced shock mitigating decking material." The sheet has two arrays of three-dimensional parabolic (also called "elliptic paraboloid") shock absorbers separated by a middle layer, such that aligned shock absorbers on one array are oriented parabolically toward the middle, separating layer and aligned shock absorbers on the second array are also oriented parabolically toward the middle, separating layer. The result of the arrays and alignments is that each parabolic shock absorber in one array is oriented at its apex with an apex of a parabolic shock absorber in the second array. In other words the first array is 180 degrees opposite of the second array with all parabolas in one array pointed toward corresponding parabolas in the second array. Above both arrays of parabolas is a relatively stiff traction layer for use in wet or watery conditions in the boat. For purposes of convenient description, the boat deck impact mitigation sheet has "apical opposing parabolic shock absorbers" as shown in FIG. 1.

Figure 2:
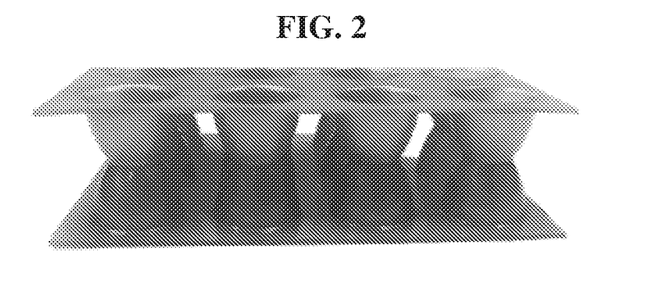
FIG. 2 is a photo of a stunt padding manufactured by Skydex Technologies, Inc.

FIG. 2 depicts a stunt padding sheet also made by Skydex Technologies, Inc., reportedly used widely in the stunt industry for high-impact, low-profile stunt padding. These stunt pads feature a patented Twin Hemisphere technology to provide resilient, lightweight impact protection. With a thinner profile than traditional foam, SKYDEX™ Impact Sheets are reported to be capable of withstanding multiple impacts with minimal performance degradation. The sheet has two arrays of three-dimensional parabolic shock absorbers but without separation by a middle layer, as seen in FIG. 1. Moreover each corresponding three-dimensional parabolic pair are restructured to eliminate the apex regions of the corresponding parabolas. The result are essentially an hour-glass shock absorber with wide intersectional area between the parabolic spaces. For purposes of convenient description, the stunt padding has "frustral opposing parabolic shock absorbers" as shown in FIG. 2.

Additional information about the structures of FIG. 1 and FIG. 2 commercial products can be found in U.S. Pat. Nos. 7,033,666 (Skaja); 7,574,760 (Foley et al.); 8,714,071 (Foley et. Al.); 8,915,339 (Kanous et al.); and 8,990,987 (Wyman et al.) all assigned to Skydex Technologies, the disclosures of which are incorporated by reference.

Figure 3:
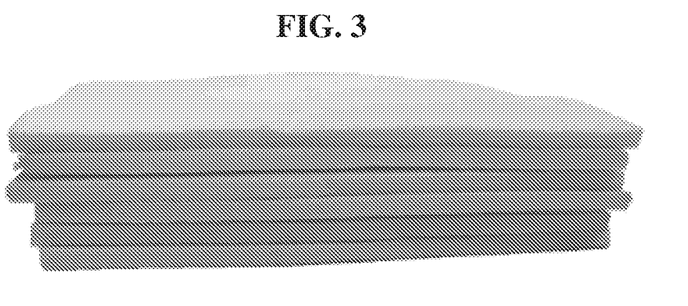
FIG. 3 is a photo of six layers of closed cell foam thermoplastic elastomer compound made according to Example 5 below.

FIG. 3 depicts six layers of closed cell foamed thermoplastic elastomer compound of Example 5.

Figure 4:
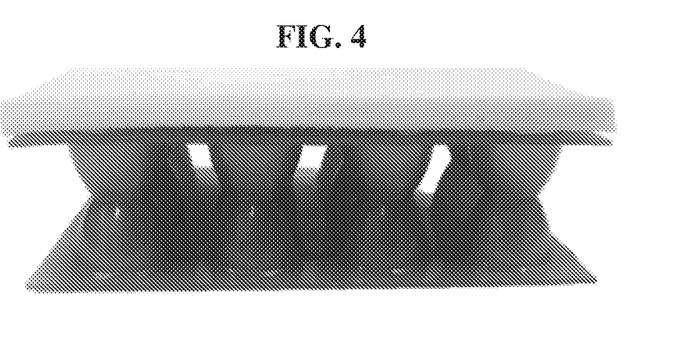
FIG. 4 is a photo of one layer of Example 5 closed cell foam thermoplastic elastomer compound on the stunt padding shown in FIG. 2.

FIG. 4 depicts one layer of Example 5 closed cell foam thermoplastic elastomer compound on the stunt padding shown in FIG. 2.

Table 6 reports the impact testing using the parameters above for each of FIGS. 1-4, denominated Comparative Examples G-I and Example 6. Each of G, H, I, and 6 were tested for G Forces at drop heights from 50-350 in 50 cm increments, with speed just above impact measured in meters/second.

TABLE 6

| | G Forces Measured at Drop Height and Speed of Impact Height (cm) | | | | | | |
|---|---|---|---|---|---|---|---|
| | 50 | 100 | 150 | 200 | 250 | 300 | 350 |
| | | | | Speed (m/s) | | | |
| Example | 3.0144 | 4.2901 | 5.2394 | 6.0725 | 6.717 | 7.3917 | 7.8949 |
| G (FIG. 1) | 114.3 | 136.8 | 138.3 | 154.4 | 166.4 | 251.1 | 400.0 |
| H (FIG. 2) | 219.0 | 254.1 | 271.7 | 276.7 | 247.6 | 287.7 | 361.4 |
| I (FIG. 3) | 99.2 | 149.9 | 196.0 | 247.6 | 296.7 | 350.3 | 414.5 |
| 6 (FIG. 4) | 150.0 | 198.5 | 221.0 | 227.0 | 232.6 | 244.1 | 274.2 |

A comparison of G and H at 350 cm shows that the stunt padding (FIG. 2) had a surprisingly stronger impact resistance than the boat deck sheet (FIG. 1). Also a comparison of I (FIG. 3) and the stunt padding of H (FIG. 2) shows that six layers of foamed thermoplastic polymer compound engineered for vibration damping had had less impact resistance than the stunt padding. Finally, a comparison of both H and I with Example 6 which combined them shows that the combination was better at impact resistance than the combination's constituents. In other words, there was a 24% reduction in G Force at 350 cm drop height in Example 6 than for Comparative Example H (274.2 compared with 361.4). Only one layer of closed cell foamed thermoplastic polymer compound made from the formulation of Example 5, providing only 0.1875 inches (0.476 cm) of additional thickness to the stunt padding improved shock impact by a surprising 24%. It is expected that one layer of foamed Example 5 of similar thickness will also improve shock impact of Comparative Example G with or without the traction outer layer.

Articles such as Example 6 (FIG. 4) can be used in multilayer sheet for shock absorption in vehicles of all types; buildings or their components; and any other structure susceptible to forceful impact of any item, especially military equipment.

Without undue experimentation, those having ordinary skill in the art can utilize the written description of the present invention, including the Examples, to formulate thermoplastic elastomer compounds that exhibit improved damping properties across a broad range of temperatures, including at or above room temperature, and across a broad range of vibrational frequencies.

All documents cited in the Embodiments of the Invention are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of the present invention.

What is claimed is:

1. An article for mitigation of impact forces, comprising
   (1) a first array and a second array of opposing parabolic shock absorbers; and
   (2) a closed cell foamed layer of thermoplastic elastomer compound comprising:
      (a) hydrogenated styrenic block copolymer having a polyisoprene soft block;
      (b) styrene-isobutylene-styrene block copolymer;
      (c) tackifier having a softening point of at least about 80° C. according to ASTM 6493; and
      (d) optionally, one or more additional thermoplastic elastomers selected from the group consisting of thermoplastic polyurethanes, copolyesters, copolyamides, thermoplastic olefins, thermoplastic vulcanizates, olefinic block copolymers, and combinations thereof;
   wherein the compound has a Compound Tan Delta Peak Temperature of at least 10° C.; and
   wherein the compound has a Compound Tan Delta Peak Height of (i) at least 0.85, provided that no additional thermoplastic elastomer is present, and (ii) at least 0.60, provided that additional thermoplastic elastomer is present and comprises thermoplastic polyurethane.

2. The article of claim 1, wherein the polyisoprene soft block of the compound is a vinyl-polyisoprene soft block.

3. The article of claim 1, wherein the polyisoprene soft block of the compound is at least partially hydrogenated.

4. The article of claim 1, wherein the hydrogenated styrenic block copolymer of the compound has a Copolymer Tan Delta Peak Temperature of less than 10° C.

5. The article of claim 1, wherein the Compound Tan Delta Peak Temperature is at least room temperature.

6. The article of claim 1, wherein the tackifier of the compound has a softening point ranging from about 80° C. to about 150° C. according to ASTM 6493.

7. The article of claim 1, wherein the tackifier of the compound has a weight average molecular weight ranging from about 400 to about 3,500.

8. The article of claim 1, wherein the tackifier of the compound comprises a saturated cyclo-aliphatic amorphous hydrocarbon resin.

9. The article of claim 1, wherein the tackifier of the compound is present in an amount ranging from about 20 parts by weight to about 200 parts by weight, per 100 parts by weight of the styrenic block copolymer.

10. The article of claim 1, wherein the compound further comprises plasticizer.

11. The article of claim 1, wherein the compound further comprises non-elastomeric secondary polymer.

12. The article of claim 1, wherein the compound further comprises filler.

13. The article of claim 1, wherein the compound further comprises at least one additive selected from the group consisting of adhesion promoters; biocides; anti-fogging agents; anti-static agents; additional blowing and foaming agents; bonding agents and bonding polymers; dispersants; flame retardants and smoke suppressants; impact modifiers; initiators; lubricants; micas; pigments, colorants and dyes; processing aids; release agents; silanes, titanates and zirconates; slip and anti-blocking agents; stabilizers; stearates; ultraviolet light absorbers; viscosity regulators; waxes; and combinations of any of the aforementioned additives.

14. The article of claim 1, wherein the compound comprises:
   (a) 100 parts by weight of the styrenic block copolymer;
   (b) from about 50 to about 500 parts by weight of the styrene-isobutylene-styrene block copolymer;
   (c) from about 20 to about 200 parts by weight of the tackifier;
   (d) from 0 to about 400 parts by weight of the optional additional thermoplastic elastomer;
   (e) from 0 to about 200 parts by weight of optional plasticizer;
   (d) from 0 to about 300 parts by weight of optional non-elastomeric secondary polymer;
   (e) from 0 to about 150 parts by weight of optional filler; and
   (f) from 0 to about 100 parts by weight of optional other additives.

15. The article of claim 1, wherein the opposing parabolic shock absorbers are frustral opposing parabolic shock absorbers.

16. The article of claim 1, wherein the opposing parabolic shock absorbers are apical opposing parabolic shock absorbers.

17. The article of claim 15, wherein the foamed layer is less than about 0.2 inches thick.

18. The article of claim 15, wherein the Gravitational Force at a drop height of 350 cm and a speed of 7.8949 meters per second of less than 300.

19. The article of claim 15, wherein the article is in the form of a multilayer sheet in a vehicle, a building, or a structure susceptible to forceful impact of any item.

20. The article of claim 19, wherein the article is a structure on military equipment.

* * * * *